United States Patent [19]

Davis et al.

[11] Patent Number: 4,487,366
[45] Date of Patent: Dec. 11, 1984

[54] POROUS-WALL COMPACT LASER DIFFUSER

[75] Inventors: James A. Davis, Thousand Oaks; Lamar F. Moon, Agoura, both of Calif.

[73] Assignee: Rockwell International Corporation, El Segundo, Calif.

[21] Appl. No.: 523,509

[22] Filed: Aug. 15, 1983

Related U.S. Application Data

[63] Continuation of Ser. No. 242,955, Mar. 12, 1981, abandoned.

[51] Int. Cl.³ ............................................. H01S 3/08
[52] U.S. Cl. .................................... 239/11; 239/124; 239/553.3; 372/89; 415/DIG. 1
[58] Field of Search ................. 239/553.5, 1, 11, 124, 239/553.3; 372/77, 89, 90; 415/DIG. 1

[56] References Cited

U.S. PATENT DOCUMENTS

| | | | |
|---|---|---|---|
| 2,709,917 | 6/1955 | Bruynes | 415/DIG. 1 X |
| 2,892,582 | 6/1959 | O'Rourke | 415/DIG. 1 X |
| 3,998,393 | 12/1976 | Petty | 372/90 X |
| 4,247,833 | 1/1981 | Morr et al. | 372/89 |

Primary Examiner—Andres Kashnikow
Attorney, Agent, or Firm—H. Fredrick Hamann; Harry B. Field

[57] ABSTRACT

A porous-wall compact diffuser designed for chemical laser applications. The laminar boundary layer in the diffuser is removed through the porous wall by suction provided by a chemical pump concept, thereby stabilizing the normal shock wave in the supersonic flow channel at the juncture with the wide-angle subsonic diffuser section.

6 Claims, 3 Drawing Figures

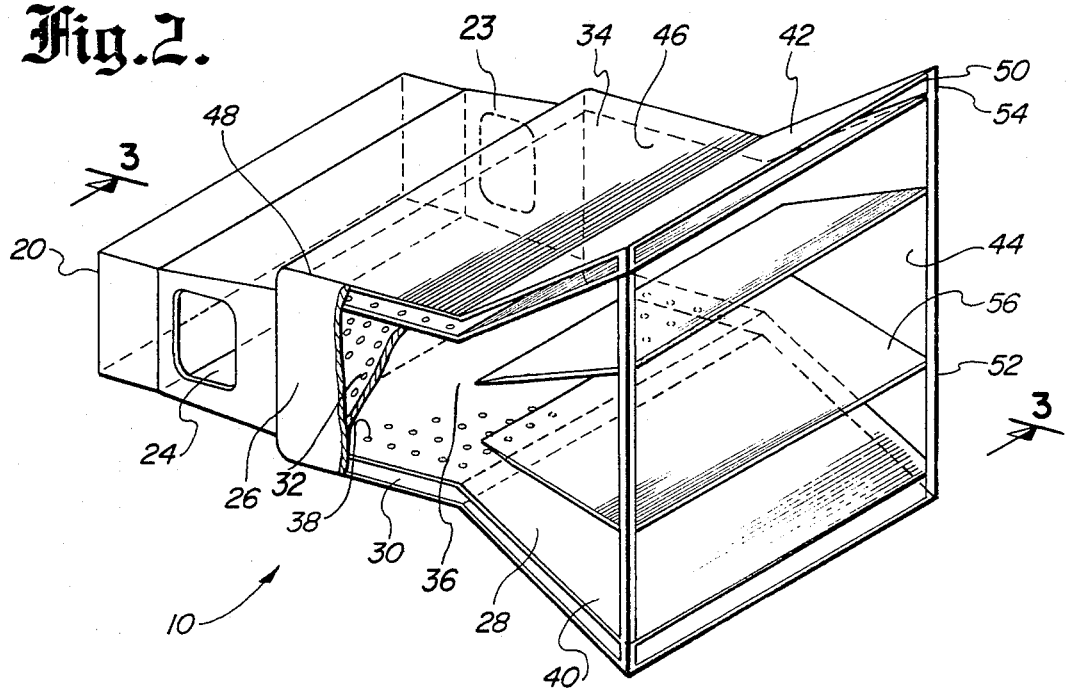
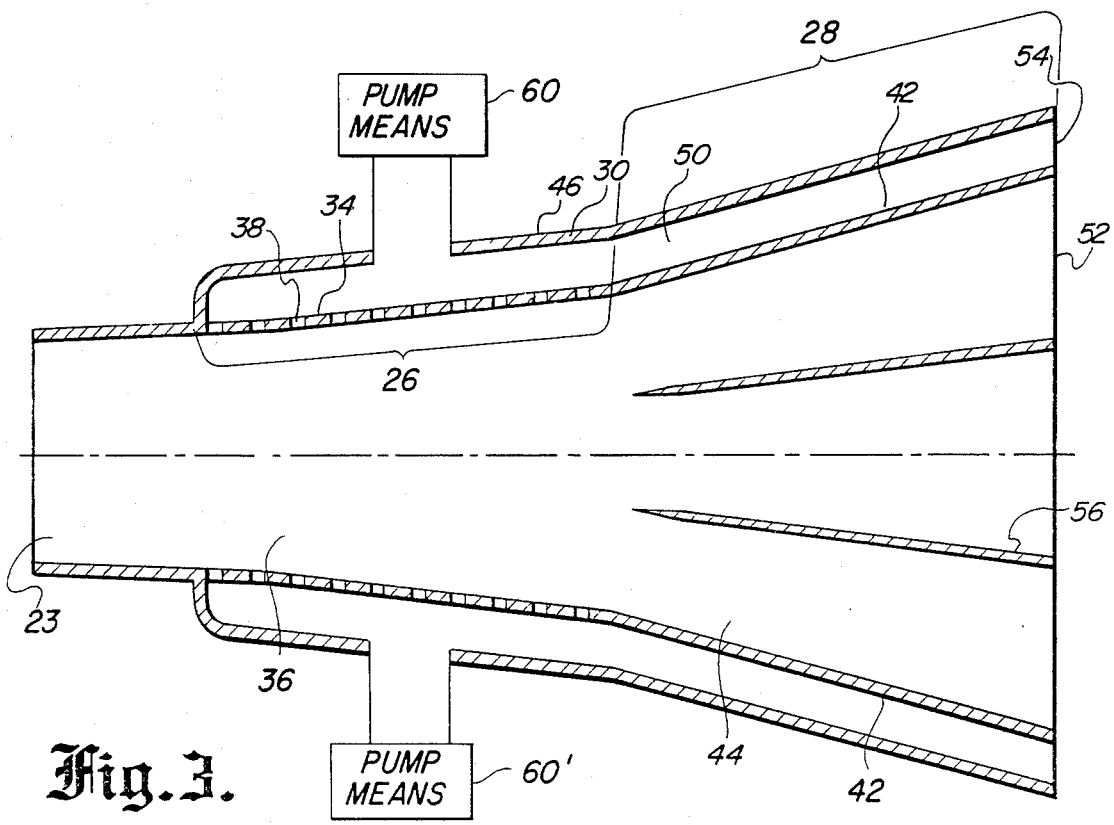

POROUS-WALL COMPACT LASER DIFFUSER

This is a continuation of application Ser. No. 242,955, filed Mar. 12, 1981, now abandoned.

BACKGROUND OF THE INVENTION

1. Field of the Invention

The invention relates to a porous-wall compact diffuser for dispersing the supersonic gas flow from the optical cavity of a chemical laser.

2. Description of the Prior Art

In chemical lasers, the reactants creating the optical emissions are mixed in a supersonic combustion process within the optical cavity. Heat release due to chemical reaction causes a reduction in the flow Mach number and an increase in static pressure within the combustion zone (Rayleigh process) for a constant area flow channel. The radial outflow nozzle designs currently in use prevent the pressure increase for the most part, but the Mach number decrease is primarily due to temperature rise and, therefore, still occurs in practice. However, the conditions at the exit of the optical cavity are still those of a hot, supersonic flow at low static pressures. Supersonic/subsonic diffusers are used to convert the remaining kinetic energy in the flow to increased static pressure in the exhaust flow. Because of the low cavity pressures and heat-release, the stagnation pressure at the diffuser entrance is less than atmospheric and must be either pumped by ejectors or large mechanical pumps or by direct absorption into chemically-active media.

Conventional diffusers are designed on the basis of oblique shock recovery limited by boundary layer flow separation. Because of the low Reynolds number flow common to chemical lasers, diffuser performance will be dominated by flow separation of the laminar boundary layers in the supersonic diffuser section. The weak oblique shock waves have relatively low pressure increases and thus avoid flow separation observed in strong adverse pressure gradients. For a conventional diffuser design consisting of a slight contraction, followed by a constant area section, and a diverging subsonic diffuser section, optimum performance is defined by conditions such that a weak oblique shock train terminates in the constant area section as a weak normal shock wave (sometimes referred to as a Mach disc). Design guidelines for diffuser constant-area section length generally are on the order of 10 entrance heights for a Mach 2 entrance flow.

Some conventional diffuser designs incorporate horizontal and/or vertical vanes to subdivide the main flow channel into several isolated flow compartments. The length-to-height ratio (L/H) requirement is then equivalent to a length-to-hydraulic diameter ratio (L/$D_H$) generally used for flow channels with near unity height-to-width aspect ratios, where $D_H$ is four times the cross-sectional area divided by the linear dimensions around the flow channel. Test results have indicated that there is a practical limit to the number of vanes that may be added to a design, and the L/$D_H$ value remains at 10 to 12 for optimum pressure recovery. Furthermore, for vanes without an entering boundary layer the number of vanes increase exponentially as length decreases. For instance, four vertical vanes would be required to reduce diffuser length by a factor of 2. An additional length reduction by another factor of 2 would require 16 compartments. Additionally, the increase in wetted surface area due to the added vanes increases frictional losses which reduces overall pressure recovery. A physical limit on wall thickness is also approached due to minimum second throat area requirements for starting and running conditions. It is believed that the vaned diffuser designs would have overall length reduction potential limited to about L/H=6.

SUMMARY OF THE INVENTION

A porous-wall compact diffuser for converting the kinetic energy of the gas flow from the optical cavity of a chemical laser. The diffuser includes a supersonic section wherein the supersonic gas flow ends in a normal shock wave, a subsonic section that increases in cross-sectional area downstream, and a boundary layer suction plenum. The supersonic section includes a plurality of holes for withdrawing the gas in the boundary layer formed between the supersonic section and the gas flow. The withdrawn gas is entrained within the plenum by a chemical pump concept.

OBJECTS OF THE INVENTION

Therefore, an object of the present invention is to provide a porous-wall compact diffuser that will stabilize the normal shock wave.

Another object of the present invention is to provide a porous-wall compact diffuser that provides for a stronger shock wave.

Yet another object of the present invention is to provide a porous-wall compact diffuser in which the boundary layer is reduced.

Still another object of the present invention is to provide a porous-wall compact diffuser in which the length-to-height ratio is reduced.

Another object of the present invention is to provide a porous-wall compact diffuser with a significant weight reduction over conventional designs.

Other objects, advantages and novel features of the present invention will become apparent from the following detailed description of the invention when considered in conjunction with the accompanying drawings.

BRIEF DESCRIPTION OF THE DRAWINGS

FIG. 2 is a perspective view of the porous-wall compact diffuser.

FIG. 3 is a cross-sectional view taken along lines 3—3 of FIG. 2.

DESCRIPTION OF THE PREFERRED EMBODIMENTS

Figure 1:
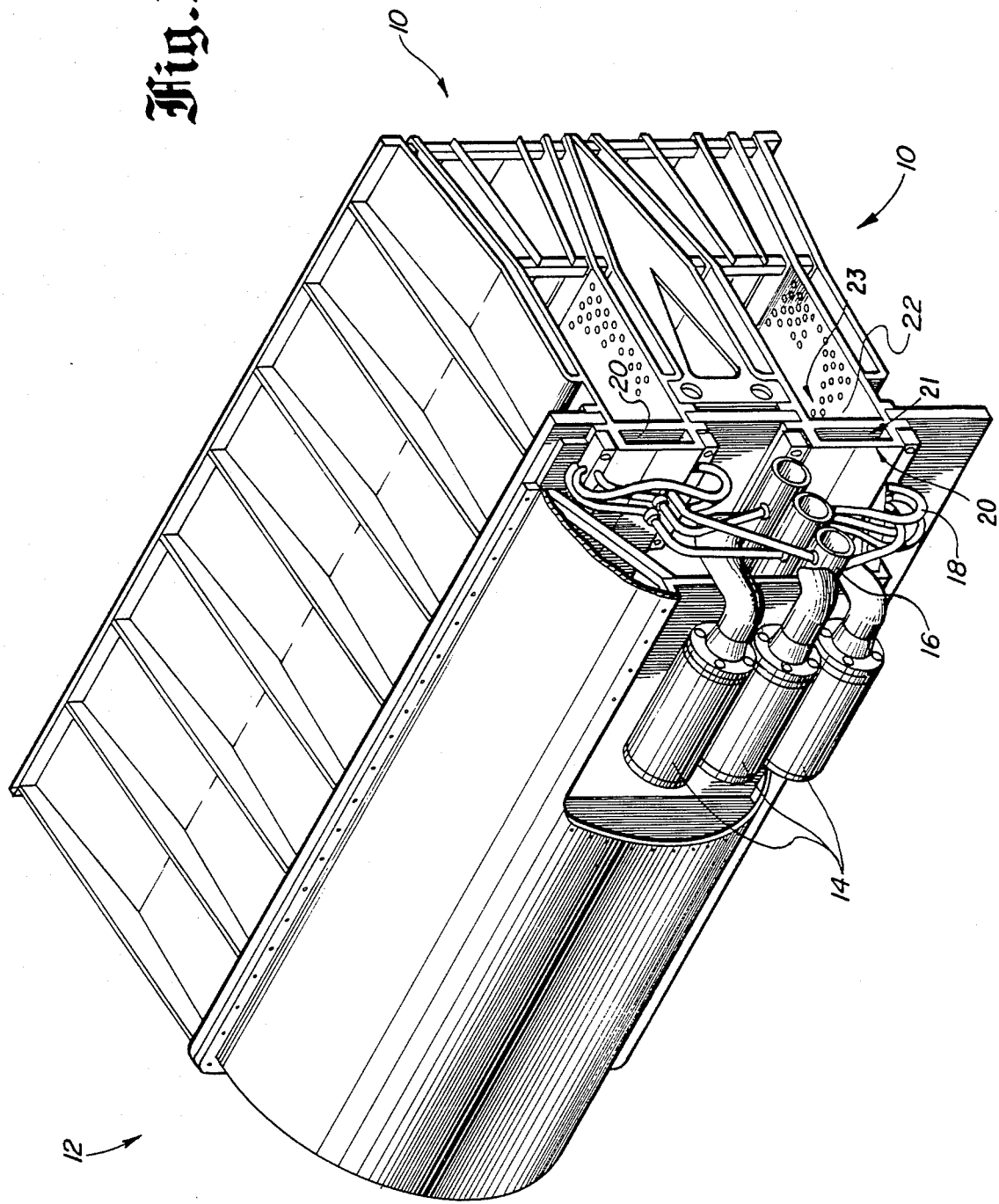
FIG. 1 is a perspective view of a chemical laser including the porous-wall compact diffuser.

The porous-wall compact laser diffuser of the present invention, generally designated 10, is shown as part of the laser system 12 depicted in FIG. 1. The laser system 12 also includes reactant inlets 14, reactant manifolds 16, feed lines 18, injection module 20, combustor 21, supersonic mixing nozzle 22 and laser optical cavity 23.

The reactants enter the laser system 12 through reactor inlets 14, thereafter passing through reactant manifolds 16 to feed lines 18. The reactants then are released into injection module 20, whereby interaction of the gases in combustor 21, as they flow through the supersonic nozzle 21 into the laser optical cavity 23, provide for the optical emissions creating the laser output.

Referring now to FIGS. 2 and 3, the diffuser 10 is juxtaposed and integrally connected to the laser optical cavity 23 for receiving the reactants as they flow from the laser optical cavity 23 at supersonic velocities 22. The laser beam passes through the optical port 24 and is perpendicular to the flow direction of the reactants. The diffuser comprises supersonic section 26, subsonic section 28, and boundary layer suction plenum 30.

The supersonic section 26 includes two opposed and parallel end walls 32 and two opposed and slightly angled side walls 34, the end walls 32 being perpendicular and integrally connected to the side walls 34. The walls 32 and 34 define a supersonic passageway 36 which the gases flow at supersonic speeds on the aggregate and whose dimensions increase downstream due to the angled end walls 32 and angled side walls 34. The supersonic section 26 is juxtaposed and integrally connected to the laser optical cavity 23 so that the passageway 36 receives all of the reactants exiting from the optical cavity 22.

The end walls 32 and the side walls 34 comprise a plurality of holes 38, which may be of any shape and a size large enough to allow the reactants to pass therethrough.

The subsonic section 28 includes two opposed and parallel end members 40 and two opposed and angled side members 42, the end members 40 being perpendicular and integrally connected to the side members 42. The members define a subsonic passageway 44 in which the gases flow at subsonic speeds and whose dimensions increase downstream due to the angled side members 42. The subsonic section 28 is juxtaposed and integrally connected to the supersonic section 26 so that the subsonic passageway receives all of the reactants exiting from the supersonic section 26 except for the small percentage of reactants drawn through the plurality of holes 38. The reactants entering the subsonic section 28 pass through a stabilized normal shock wave which decelerates the gas flow from supersonic velocities to subsonic velocities upon entering the subsonic section 28.

The boundary layer suction plenum 30 includes two side panels 46 and two opposed and parallel end panels 48, the end panels 48 being perpendicular and integrally connected to side panels 46 and defining a bleed passageway 50 that receives all of the reactants passing through holes 38. Alternatively, the boundary layer suction plenum 30 may also encircle the entire supersonic section 26 and subsonic section 28, drawing gas through holes in the end walls 32 as well as the side walls 34. Pump means 60,60' are connected to the plenum 30 through the side panels 46, for example, to provide suction for the gas in the plenum 30. If the plenum 30 is formed as a single surrounding chamber, only one pump may be employed.

The subsonic passageway 44 and bleed passageway 50 terminate in subsonic section exit 52 and plenum exit 54. Vanes 56 are located in the subsonic passageway 44 to assist in the flow exiting the diffuser.

In operation, the reactants are mixed in a supersonic combustion process within the laser optical cavity 23. The supersonic reactant flow then enters the supersonic section 26 of the diffuser 10. A boundary layer circumscribing the flow of reactants exists along the side walls 34 and end walls 32 in the supersonic passageway 36. A portion of the reactants in the boundary layer are drawn through holes 38 into boundary layer section plenum 30, preferably by means of a conventional chemical pump creating a lower pressure in the plenum 30. Thus, the boundary layer is reduced, thereby stabilizing a normal shock wave at the junction of the supersonic and subsonic sections.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A chemical laser diffuser for increasing the pressure and reducing the velocity of a supersonic gas flow, comprising:
    a supersonic section wherein said supersonic gas flow tends to create a boundary layer circumscribing said supersonic gas flow;
    a subsonic section juxtaposed and integrally connected to said supersonic section so that said gas flow progresses sequentially through said supersonic section and said subsonic section; and
    means for reducing said boundary layer in the supersonic section to stabilize a strong normal shock at the downstream exit of said supersonic section, and wherein said means comprises a perforated wall defining said supersonic section, a plenum chamber circumscribing said perforated wall and a chemical pump integral with said plenum chamber for creating a low pressure in said plenum thereby drawing off a portion of said boundary layer.

2. A method of diffusing a supersonic gas flow and stabilizing a strong, normal shock, comprising the steps of:
    directing said supersonic gas flow into a perforated supersonic section of a diffuser, wherein said supersonic gas flow creates a boundary layer circumscribing said supersonic gas flow;
    drawing a portion of said boundary layer through said perforations and a plenum chamber into a chemical pump; and
    dispersing said supersonic gas flow and the remaining boundary layer portion into a subsonic section.

3. A dynamic-gas-laser diffuser for increasing the pressure and reducing the velocity of a supersonic gas flow comprising:
    a supersonic chamber through which reactant gas flows at supersonic speed, the gas flow having a boundary layer surrounding the main central flow;
    a subsonic chamber adjoining said supersonic chamber on the downstream side thereof, the gas flow progressing from the supersonic chamber through the subsonic chamber; and
    means for reducing the boundary layer in the supersonic chamber to stabilize a strong normal shock wave at the downstream exit of the supersonic chamber, said reducing means comprising a plenum chamber surrounding and contiguous with said supersonic chambers, the plenum and supersonic chambers sharing common connecting walls having perforations therein, and means for connecting the plenum chamber to pump means for creating a low pressure in said plenum chamber and thereby drawing off at least a portion of said boundary layer in said supersonic chamber through said perforations.

4. A diffuser as set forth in claim 3, wherein said pump means comprises a chemical pump.

5. A method of diffusing a supersonic gas flow in a supersonic chamber contiguous with and upstream of a subsonic chamber in a dynamic gas laser, comprising the steps of:

directing a supersonic gasflow into a supersonic flow chamber wherein said supersonic flow is circumscribed by a boundary layer flow;

drawing boundary layer flow into a plenum chamber through perforations in common walls between said supersonic chamber and a circumscribing plenum chamber; and dispersing the remainder of the supersonic flow into a subsonic chamber adjoining the supersonic chamber.

6. A method as set forth in claim 5, wherein said boundary layer flow is drawn into said plenum chamber by means of a chemical pump.

* * * * *